United States Patent
Wu et al.

(10) Patent No.: US 11,274,817 B2
(45) Date of Patent: Mar. 15, 2022

(54) PANEL TYPE COMBINED PLANT LAMP

(71) Applicant: FUJIAN SANAN SINO-SCIENCE PHOTOBIOTECH CO., LTD., Fujian (CN)

(72) Inventors: Chanjuan Wu, Fujian (CN); Shaoqing Lin, Fujian (CN); Wenfa Wang, Fujian (CN)

(73) Assignee: FUJIAN SANAN SINO-SCIENCE PHOTOBIOTECH CO., LTD., Quanzhou (CN)

( * ) Notice: Subject to any disclaimer, the term of this patent is extended or adjusted under 35 U.S.C. 154(b) by 0 days.

(21) Appl. No.: 17/258,147

(22) PCT Filed: Nov. 1, 2019

(86) PCT No.: PCT/CN2019/115106
§ 371 (c)(1),
(2) Date: Jan. 5, 2021

(87) PCT Pub. No.: WO2020/155718
PCT Pub. Date: Aug. 6, 2020

(65) Prior Publication Data
US 2021/0348746 A1    Nov. 11, 2021

(30) Foreign Application Priority Data

Jan. 30, 2019 (CN) .......................... 201910093410.8
Apr. 4, 2019 (CN) .......................... 201910270702.4

(51) Int. Cl.
*F21V 21/29* (2006.01)
*A01G 7/04* (2006.01)
(Continued)

(52) U.S. Cl.
CPC .............. *F21V 21/29* (2013.01); *A01G 7/045* (2013.01); *F21S 8/028* (2013.01); *F21W 2131/30* (2013.01)

(58) Field of Classification Search
CPC ........... F21V 21/29; A01G 7/045; F21S 8/028
(Continued)

(56) References Cited

U.S. PATENT DOCUMENTS 6,688,759 B1 * 2/2004 Hadjimichael ........ A01G 7/045
362/405
7,517,101 B2 * 4/2009 Tobin ................... A61N 5/0616
362/1

(Continued)

FOREIGN PATENT DOCUMENTS

| CN | 202938142 U | 5/2013 |
| CN | 206036784 U | 3/2017 |

(Continued)

OTHER PUBLICATIONS

International Search Report of PCT/CN2019/115106.
Written Opinion of PCT/CN2019/115106.

*Primary Examiner* — Laura K Tso
(74) *Attorney, Agent, or Firm* — Dragon Sun Law Firm, PC; Jinggao Li, Esq.

(57) ABSTRACT

The present invention relates to the technical field of plant lighting, in particular to a panel type combined plant lamp, at least including a panel lamp. Any end of the panel lamp is provided with a rotating connection part, the joint of the rotating connection part and the panel lamp is provided with a slide sleeve plate, the slide sleeve plate includes a pulling plate and a bottom plate, the bottom plate is fixedly connected to the panel lamp or the rotating connection part, the pulling plate is fixedly connected to the panel lamp or the rotating connection part, the thickness of the panel lamp is 3 to 40 mm, the slide sleeve plate is internally provided with (Continued)

a slide groove along the length direction, both sides of the slide groove are provided with openings.

7 Claims, 3 Drawing Sheets

(51) Int. Cl.
*F21S 8/02* (2006.01)
*F21W 131/30* (2006.01)

(58) Field of Classification Search
USPC .......................... 362/249.01, 147, 219, 220
See application file for complete search history.

(56) References Cited

U.S. PATENT DOCUMENTS

| | | | |
|---|---|---|---|
| 9,901,039 B1* | 2/2018 | Dellerson | A01G 9/249 |
| 10,842,082 B1* | 11/2020 | Genga, Jr | F21V 23/0471 |
| 2010/0277078 A1 | 11/2010 | Morton | |
| 2018/0087755 A1* | 3/2018 | Yorio | F21K 9/275 |
| 2020/0041107 A1* | 2/2020 | Van Der Schyf | E05D 3/02 |
| 2020/0367443 A1* | 11/2020 | Dow | A01G 9/249 |

FOREIGN PATENT DOCUMENTS

| | | | |
|---|---|---|---|
| CN | 206280883 U | 6/2017 | |
| CN | 107101103 A | 8/2017 | |
| CN | 107763512 A | 3/2018 | |
| CN | 108626641 A | 10/2018 | |
| CN | 109997549 A | 7/2019 | |
| KR | 20140078183 A | 6/2014 | |

* cited by examiner

PANEL TYPE COMBINED PLANT LAMP

CROSS-REFERENCE TO RELATED APPLICATIONS

This application is a national stage application of PCT/CN2019/115106. This application claims priorities from PCT Application No. PCT/CN2019/115106, filed Nov. 1, 2019, Chinese patent application 201910093410.8 filed Nov. 1, 2019, and Chinese patent application 201910270702.4 filed Apr. 4, 2019 the content of which is incorporated herein in the entirety by reference.

BACKGROUND

Technical Field

The present invention relates to the technical field of plant lighting, in particular to a panel type combined plant lamp.

Related Art

When a panel type plant lamp is applied to multi-layer planting, with limited height of the planting space of multi-layer planting, the light intensity of the lamp can no longer be reduced by adjusting the height of the lamp when the lamp has been disposed on the top. At this time, the light density can be further reduced by increasing the horizontal distance between lamps, but at the same time, the light uniformity of a light receiving surface is reduced. In the middle of a planting region, due to the superimposed effect of a plurality of lamps, the light uniformity is significantly improved. However, the edge of the planting region has no superimposed effect, and the light intensity is insufficient, which can easily cause the abnormal growth of edge plants. Or, light sources are the waste due to a fixed lamp distribution solution above a working aisle.

SUMMARY

The present invention aims to provide a panel type combined plant lamp. The problems in the above related art can be solved by a rotatable mechanism and a length adjusting structure on the panel lamp.

In order to achieve the above objective, the present invention provides the following technical solutions: a panel type combined plant lamp at least includes a panel lamp, and any end of the panel lamp is provided with a rotating connection part.

As a further solution of the present invention, the joint of the rotating connection part and the panel lamp is provided with a slide sleeve plate, and the slide sleeve plate includes a pulling plate and a bottom plate.

As a further solution of the present invention, the bottom plate is fixedly connected to the panel lamp or the rotating connection part.

As a further solution of the present invention, the pulling plate is fixedly connected to the panel lamp or the rotating connection part.

As a further solution of the present invention, the thickness of the panel lamp is 3 to 40 mm.

As a further solution of the present invention, the thickness of the panel lamp is 10 to 25 mm.

As a further solution of the present invention, the slide sleeve plate is internally provided with a slide groove along the length direction, both sides of the slide groove are provided with openings, the side wall of the slide sleeve plate is provided with a limiting through hole along the length direction, and the limiting through hole is communicated with the slide groove.

As a further solution of the present invention, a limiting component matched with the limiting through hole is fixedly mounted on the side wall of the pulling plate, and a wall fixation component is detachably mounted at the other end, which is not the rotating connection part, of the pulling plate.

As a further solution of the present invention, the rotating connection part and the pulling plate are integrally formed, a chamfer for reserving a rotating space is formed between the rotating connection part and the pulling plate, the rotating connection part is provided with a positioning threaded hole, and a threaded pin is disposed in the positioning threaded hole.

As a further solution of the present invention, the panel lamp is also equipped with a connecting wire.

As a further solution of the present invention, a first pulling plate is rotatably mounted on one side of the slide sleeve plate along the length direction, the slide sleeve plate and the first pulling plate slide relatively, and an end surface of the first pulling plate away from the first slide sleeve plate is provided with a first rotating connection part.

As a further solution of the present invention, a first pulling plate and a second pulling plate are slidably mounted on both sides of the slide sleeve plate along the length direction, one end of the first pulling plate is provided with a first rotating connection part, the second pulling plate is provided with a second rotating connection part, the first rotating connection part and the second rotating connection part are rotatably connected through a rotating shaft, a wall fixation component is detachably mounted at the other end, which is not the second rotating connection part, of the second pulling plate, and the second pulling plate is detachably connected to the wall fixation component.

The present invention has the following beneficial effects:

The above technical solutions provided by the present invention can obtain significant beneficial effects. By means of cooperation of the slide sleeve plate and the pulling plate, the number of panel lamps can be increased or decreased, so that the lamps can be used according to actual needs, and the limitations of use occasions of the panel lamps are greatly reduced. The slide sleeve plate and the pulling plate can realize limited slide so as to realize the adjustment of the light distance between the panel lamps, so that the light uniformity of the light receiving surface of the plant is significantly improved. By means of limited rotational connection between the two pulling plates, the adjustment of the light angle of each panel lamp can be realized, the light distribution of a plurality of panel lamps which are combined can be changed so as to realize the adjustment of the light intensity, and at the same time, unnecessary light waste in the working aisle can be avoided so as to save energy sources. Moreover, the slide sleeve plate and the pulling plate are simple in structure and low in production cost, thereby greatly reducing the production cost of the plant and bringing good economic benefits to the enterprise.

Figure 1:
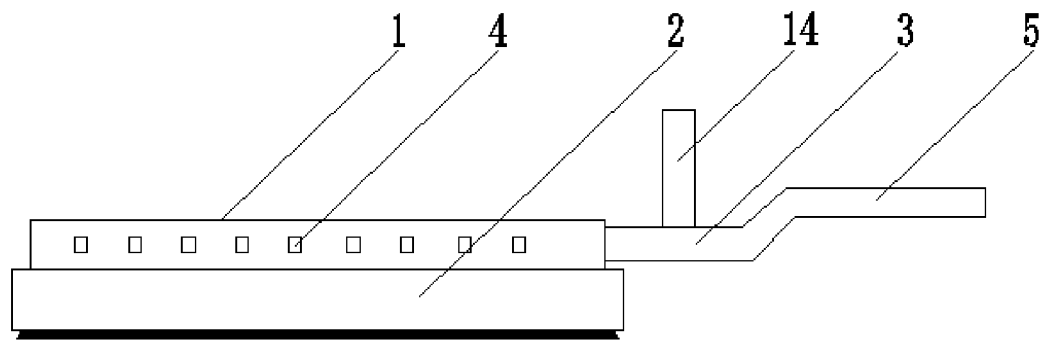
FIG. 1 is a schematic structural view of a panel type combined plant lamp.

In the figures: first slide sleeve plate 1, panel lamp 2, first pulling plate 3, limiting through hole 4, first rotating connection part 5, wall fixation component 6, second pulling plate 7, second slide sleeve plate 8, positioning threaded hole 9, rotating shaft 10, limiting component 11, third pulling plate 12, fourth pulling plate 13, first mounting component 14, second rotating connection part 15, second mounting component 16, third slide sleeve plate 17.

DETAILED DESCRIPTION

The following describes implementations of the present invention by using specific embodiments. A person skilled in the art may easily understand other advantages and effects of the present invention from the content disclosed in this specification.

It should be noted that the structures, proportions, sizes, and the like shown in the drawings of the specification, in coordination with the content disclosed in the specification, are only used to help a person skilled in the art to read and understand, and they are not intended to limit the conditions under which the present invention can be implemented and therefore have no technical significance. Any modifications to the structure, changes to the proportional relationship or the adjustment on the size should fall within the scope of the technical content disclosed by the present invention without affecting the effects and the objectives that can be achieved by the present invention. In addition, the terms such as "upper", "lower", "left", "right", "middle", and "a" mentioned in this specification are also merely for facilitating clear descriptions, but are not intended to limit the scope of implementation of the present invention. Without substantially changing the technical contents, changes or adjustments of relative relationships thereof should also fall within the scope of implementation of the present invention.

Referring to FIG. 1, a panel type combined plant lamp includes a panel lamp 2, one end of the panel lamp 2 is provided with a first rotating connection part 5, the joint of the panel lamp 2 and the first rotating connection part 5 is provided with a first slide sleeve plate 1, the first slide sleeve plate 1 is internally provided with a slide groove, the slide groove is formed along the length direction of the first slide sleeve plate 1, both ends of the slide groove are provided with openings, and the thickness of the panel lamp 2 is 15 mm. In some other embodiments, the thickness of the panel lamp may be any value from 3 mm to 40 mm, such as 25 mm. The power of the panel lamp is 80 to 600 W. The first slide sleeve plate 1 includes a first pulling plate 3 and a bottom plate. The bottom plate and the panel lamp 2 are fixedly connected in a fixing manner which may be screw fixing, glue fixing or slide rail slot fixing, preferably screw fixing and slide rail slot fixing. By means of screw fixing and slide rail slot fixing, the panel lamp 2 is convenient to mount and detach, and the panel lamp 2 is convenient to detach and overhaul when a fault occurs. A first pulling plate 3 is slidably mounted on one side of the first slide sleeve plate 1 along the length direction. By means of relative sliding of the first slide sleeve plate 1 and the first pulling plate 3, the distance between panel lamps 2 can be adjusted, and the light receiving surface of the plant can be increased. The side wall of the first slide sleeve plate 1 is provided with a plurality of limiting through holes 4, the limiting through holes 4 are communicated with the slide groove, the end surface of the first pulling plate 3 away from the first slide sleeve plate 1 is provided with a first rotating connection part 5, the first rotating connection part 5 and the first pulling plate 3 are integrally formed, and a chamfer for reserving a rotating space is formed between the first rotating connection part 5 and the first pulling plate 3.

Figure 2:
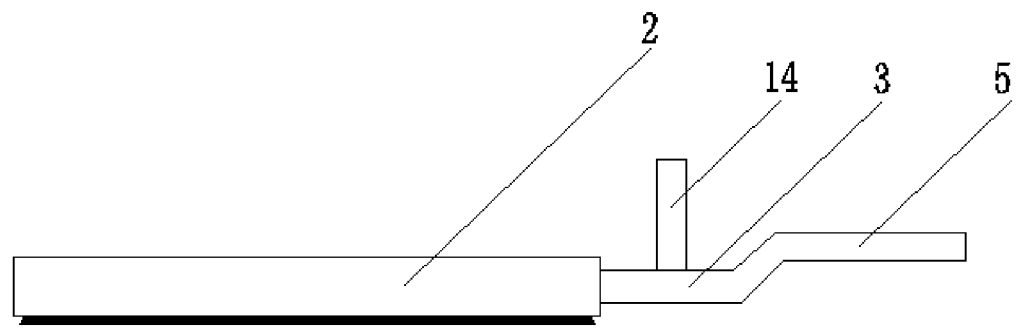
FIG. 2 is a mounting view of a panel lamp and a pulling plate in a panel type combined plant lamp.

Referring to FIG. 2, one end of the panel lamp 2 may also be directly fixedly connected to the first rotating connection part 5 through the first pulling plate 3, and the panel lamp 2 may also be directly fixedly connected to the first rotating connection part 5 through the bottom plate.

Figure 3:
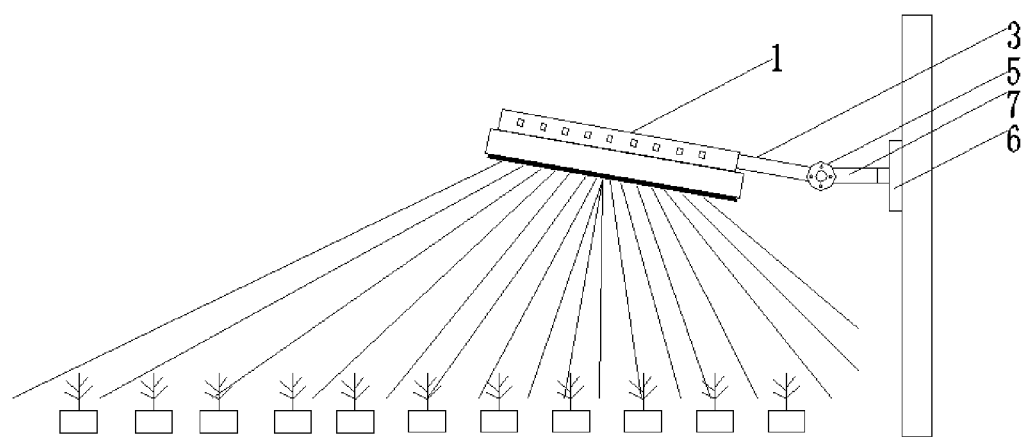
FIG. 3 is a mounting view of a panel lamp in a panel type combined plant lamp on a side wall.

Referring to FIG. 3, a panel lamp is fixedly mounted at the bottom of a first slide sleeve plate 1, a first pulling plate 3 is slidably mounted on one side of the first slide sleeve plate 1 along the length direction, one end of the first pulling plate 3 is provided with a first rotating connection part 5, the second pulling plate 7 is provided with a second rotating connection part 15 (referring to FIG. 6), the first rotating connection part 5 and the second rotating connection part 15 are rotatably connected through a rotating shaft 10 (referring to FIG. 5) so as to realize the adjustment of the light angle of the panel lamp 2, a wall fixation component 6 is detachably mounted at the other end, which is not the second rotating connection part 15, of the second pulling plate 7, the second pulling plate 7 and the wall fixation component 6 can be detachably connected by means of threaded connection, and the back of the wall fixation component 6 is fixed to a wall through screws, thereby realizing the wall-mounted installation of a single panel lamp, and facilitating the adjustment of the light angle of the panel lamp.

Figure 4:
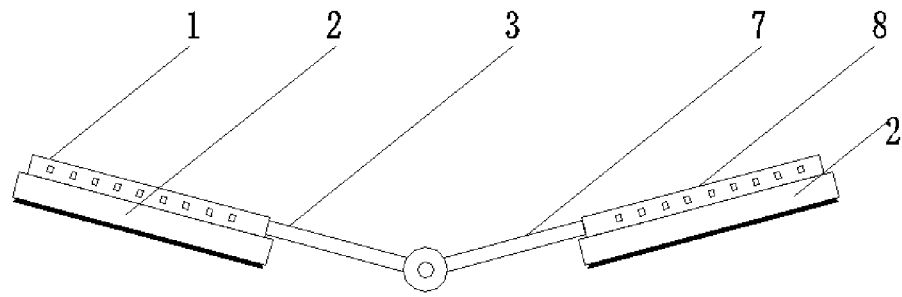
FIG. 4 is a schematic view of connection of two groups of panel lamps in a panel type combined plant lamp.

Referring to FIG. 4, a first pulling plate 3 is slidably mounted on one side of a first slide sleeve plate 1 along the length direction, the other end of the first pulling plate 3 is provided with a first rotating connection part 5 (referring to FIG. 5), a second pulling plate 7 is slidably mounted on one side of a second slide sleeve plate 8 along the length direction, the other end of the second pulling plate 7 is provided with a second rotating connection part 15 (referring to FIG. 6), the first rotating connection part 5 and the second rotating connection part 15 are rotatably connected through a rotating shaft, and panel lamps 2 are fixedly mounted at the bottoms of the first slide sleeve plate 1 and the second slide sleeve plate 8, thereby realizing the adjustment of the angles of the two groups of panel lamps and the distance between light sources.

Figure 5:
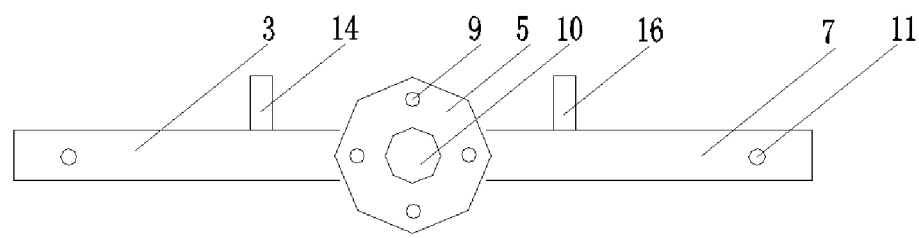
FIG. 5 is a schematic structural view of a rotating connection part in a panel type combined plant lamp.
Figure 6:
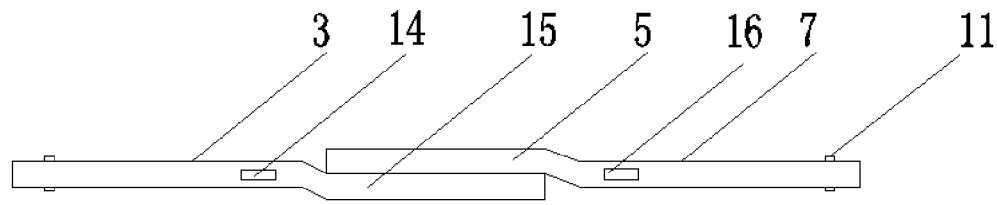
FIG. 6 is a schematic view of connection of two groups of pulling plates in a panel type combined plant lamp.

Referring to FIG. 5 and FIG. 6, one end of the first pulling plate 3 is provided with a first rotating connection part 5, one end of the second pulling plate 7 is provided with a second rotating connection part 15, and the first rotating connection part 5 and the second rotating connection part 15 are rotatably connected through a rotating shaft 10 so as to realize rotational connection between the two pulling plates. The first pulling plate 3 and the second pulling plate 7 are also provided with a plurality of positioning threaded holes 9, the positioning threaded holes 9 are annularly distributed, and threaded pins for fixing the first pulling plate 3 and the second pulling plate 7 are disposed in the positioning threaded holes 9. After the first pulling plate 3 rotates by a certain angle relative to the second pulling plate 7, the limitation is realized by cooperation of the threaded pins and the positioning threaded holes 9. The first rotating connection part 5 and the second rotating connection part 15 can also realize the limited rotation between the two pulling plates through a damper and a limiting gear. Limiting components 11 for matching with the limiting through holes 4 are fixedly mounted on the side walls of the first pulling plate 3 and the second pulling plate 7. Preferably, the limiting component 11 is a ball spring. When the first pulling plate 3 is pulled, the first pulling plate 3 slides in the slide groove of the first slide sleeve plate 1, and the ball spring automatically extends and compresses under the action of the spring. When the first pulling plate 3 is pulled to a prescribed position, the ball spring is just clamped in the corresponding limiting through hole 4, so that the limited slide of the first pulling plate 3 and the first slide sleeve plate 1 is realized.

Figure 7:
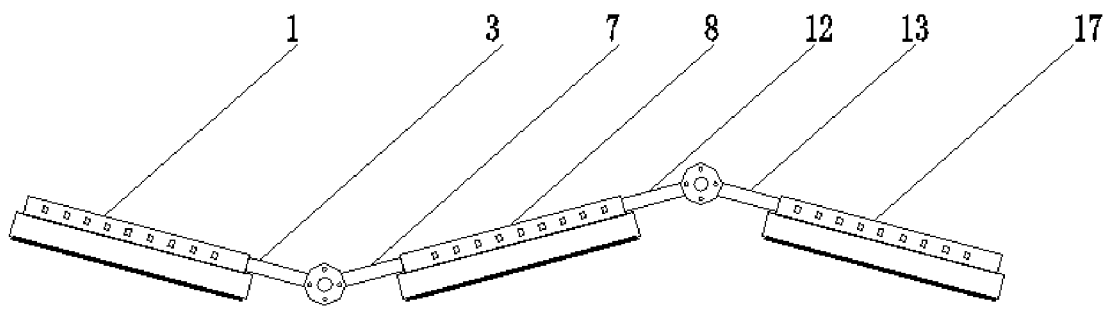
FIG. 7 is a schematic view of connection of a plurality of groups of panel lamps in a panel type combined plant lamp.

Referring to FIG. 7, a first pulling plate 3 is slidably mounted on one side of a first slide sleeve plate 1 along the length direction, a second pulling plate 7 and a third pulling plate 12 are slidably mounted on both sides of a second slide sleeve plate 8 respectively along the length direction, and a fourth pulling plate 13 is slidably mounted on one side of a third slide sleeve plate 17 along the length direction. The first pulling plate 3 and the second pulling plate 7 are rotatably connected through a rotating connection part, and the third pulling plate 12 and the fourth pulling plate 13 are rotatably connected through a rotating connection part, so that the connection and angle adjustment of the three groups of panel lamps are realized, and at the same time, the adjustment of the distance between the panel lamps can be realized. By adjusting the light angle and lamp distance, the light range is expanded, the light uniformity of the light receiving surface of the plant is improved, the blind area of the light is eliminated, and at the same time, the rotational connection between a plurality of groups of panel lamps is realized, so that the practicability is good.

Figure 8:
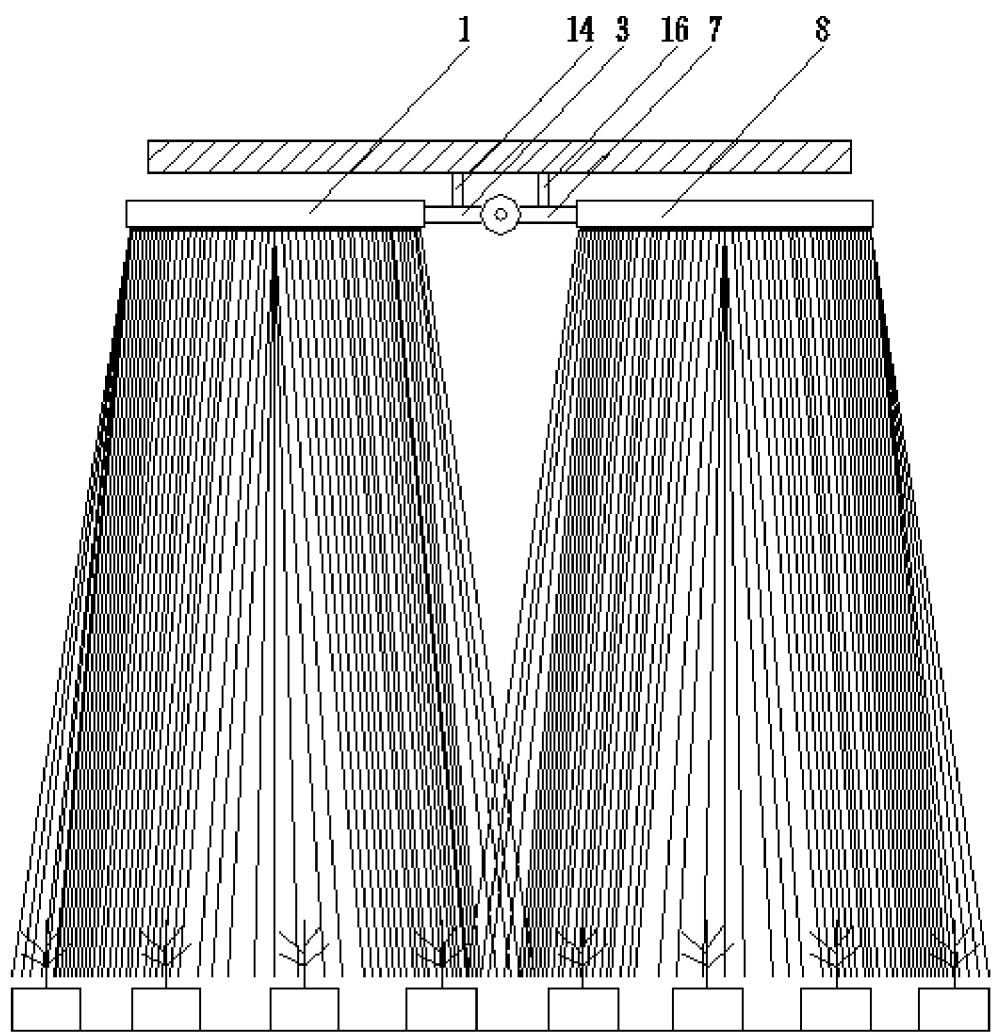
FIG. 8 is a schematic mounting view of panel lamps in a panel type combined plant lamp on a ceiling.

Referring to FIG. 5 and FIG. 8, a first pulling plate 3 is slidably mounted on a first slide sleeve plate 1 along the length direction, a second pulling plate 7 is slidably mounted on a second slide sleeve plate 8 along the length direction, the rotating connection part of the first pulling plate 3 and the rotating connection part of the second pulling plate 7 are rotatably connected through a rotating shaft, panel lamps are fixedly mounted at the bottoms of the first slide sleeve plate 1 and the second slide sleeve plate 8, the first pulling plate 3 is detachably connected with a first mounting component 14, the second pulling plate 7 is detachably connected with a second mounting component 16, and the other ends of the first mounting component 14 and the second mounting component 16 are fixedly mounted on a top wall, thereby realizing the ceiling mounting of the two panel lamps. At the same time, by means of the limited slide between the pulling plate and the slide sleeve plate, in the case of ceiling mounting, the distance between the two panel lamps can be adjusted.

It can be seen that the above technical solutions provided by the present invention can obtain significant beneficial effects. By means of cooperation of the slide sleeve plate and the pulling plate, the number of panel lamps can be increased or decreased, so that the lamps can be used according to actual needs, and the limitations of use occasions of the panel lamps are greatly reduced. The slide sleeve plate and the pulling plate can realize limited slide so as to realize the adjustment of the light distance between the panel lamps, so that the light uniformity of the light receiving surface of the plant is significantly improved. By means of limited rotational connection between the two pulling plates, the adjustment of the light angle of each panel lamp can be realized, the light distribution of a plurality of panel lamps which are combined can be changed so as to realize the adjustment of the light intensity, and at the same time, unnecessary light waste in the working aisle can be avoided so as to save energy sources. Moreover, the slide sleeve plate and the pulling plate are simple in structure and low in production cost, thereby greatly reducing the production cost of the plant and bringing good economic benefits to the enterprise.

Although the present invention is described in detail with reference to the foregoing embodiments, a person skilled in the art may still make modifications to the technical solutions described in the foregoing embodiments or make equivalent replacements to some technical features thereof, and any modification, equivalent replacement, or improvement made within the spirit and principle of the present invention shall fall within the protection scope of the present invention.

What is claimed is:

1. A panel type combined plant lamp, at least comprising:
a first panel lamp assembly; and
a second panel lamp assembly coupled to the first panel lamp assembly via a single rotation joint; wherein:
the first panel lamp assembly comprises:
   a first panel lamp (2);
   a first slide sleeve plate (1) disposed above the first panel lamp and fixedly connected to the first panel lamp (2);
   a first pulling plate (3) inserted into the first slide sleeve plate (1) from a right side of the first slide sleeve plate (1), wherein a left side of the first pullint plate (3) is located inside the first slide sleeve plate (1);
   a first rotating connection part (5) fixedly connected to a right side of the first pulling plate (3); and
   a first mounting component (14) perpendicular or substantially perpendicular to the first pulling plate (3) and connected to a middle portion of the first pulling plate (3),
   wherein a first side wall of the first slide sleeve plate (1) is provided with a plurality of first limiting through hole (4) along a length direction of the first slide sleeve plate (1),
the second panel lamp assembly comprises:
   a second panel lamp (2);
   a second slide sleeve plate (8) disposed above the second panel lamp and fixedly connected to the second panel lamp (2);
   a second pulling plate (7) inserted into the second slide sleeve plate (8) from a left side of the second slide sleeve plate (2), wherein a right side of the second plulling plate is located inside the second slide sleeve plate (8),
   a second rotating connection part (15) fixedly connected to the second pulling plate (7); and
   a second mounting component (16) perpendicular or substantially perpendicular to the second pulling plate (7) and connected to a middle portion of the second pulling plate (7),
   wherein a second side wall of the second slide sleeve plate (1) is provided with a plurality of second limiting through holes (18) along a length direction of the second slide sleeve plate (1),
the single rotation joint comprises the first rotating connection part (5) rotatably coupled to the second rotating connection part (15) via a rotating shaft (10);

the panel type combined plant lamp is configured to be mounted to a ceiling via the first mounting component (14) and the second mounting component (16);

the first slide sleeve plate (1) is configured to slide along the first pulling plate (3);

the second slide sleeve plate (8) is configured to slide along the second pulling plate (7);

the first pulling plate (3) is provided with a first limiting component (11) configured to clamp into at least one of the plurality of the first limiting through holes of the first slide sleeve plate (1) and prevent the first slide sleeve plate (1) from sliding along the first pulling plate (3);

the second pulling plate (7) is provided with a second limiting component (11) configured to clamp into at least one of the plurality of the plurality of the second limiting through holes of the second slide sleeve plate (8) and prevent the second slide sleeve plate (8) from sliding along the second pulling plate (7); and the first panel lamp (2) and the second panel lamp (2) are fixedly mounted at bottoms of the first slide sleeve plate (1) and the second slide sleeve plate (8), the first pulling plate (3) is detachably connected with the first mounting component (14), the second pulling plate (7) is detachably connected with the second mounting component (16), and the other ends of the first mounting component (14) and the second mounting component (16) are fixedly mounted on a top wall, thereby realizing a ceiling mounting of the first panel lamp (2) and the second panel lamp (2).

2. The panel type plant lamp according to claim 1, wherein the thickness of the first panel lamp (2) is 3 to 40 mm and the thickness of the second panel lamp (2) is 3 to 40 mm.

3. The panel type plant lamp according to claim 2, wherein the thickness of the first panel lamp (2) is 10 to 25 mm and the thickness of the second panel lamp (2) is 10 to 25 mm.

4. The panel type plant lamp according to claim 1, wherein the-power of the first panel lamp (2) is 80 to 600 W and the power of the second panel lamp (2) is 80 to 600 W.

5. The panel type plant lamp according to claim 1, wherein the first rotating connection part (5) and the first pulling plate (3) are integrally formed, the second rotating connection part (15) and the second pulling plate (7) are integrally formed, the first rotating connection part (5) and the second rotating connection part (15) are provided with a plurality of positioning threaded holes (9), the plurality of positioning threaded holes (9) are annularly and evenly distributed, and the plurality of positioning threaded holes (9) are configured to accept one or more threaded pins such that an angle between the first pulling plate (3) and the second pulling plate (7) is fixed.

6. The panel type plant lamp according to claim 5, wherein the bottoms of the first slide sleeve plate (1) and the second slide sleeve plate (8) are fixedly connected to the first panel lamp (2) and the second panel lamp (2), respectively, via screw fixing or slide rail slot fixing and the first panel lamp (2) and the second panel lamp (2) are detachable from the first slide sleeve plate (1) and the second slide sleeve plate (8), respectively.

7. The panel type plant lamp according to claim 6, wherein the first limiting component (11) is a first ball spring and the second limiting component (11) is a second ball spring; when the first pulling plate (3) is pulled, the first pulling plate (3) slides in the the first slide sleeve plate (1), and the first ball spring automatically extends and compresses under an action of the first ball spring; when the first pulling plate (3) is pulled to a first prescribed position, the first ball spring is clamped in a first corresponding limiting through hole (4), so that a limited slide of the first pulling plate (3) and the first slide sleeve plate (1) is realized; and when the second pulling plate (7) is pulled, the second pulling plate (7) slides in the the second slide sleeve plate (8), and the second ball spring automatically extends and compresses under an action of the second ball spring; when the second pulling plate (7) is pulled to a second prescribed position, the second ball spring is clamped in a second corresponding limiting through hole (4), so that a limited slide of the second pulling plate (7) and the second slide sleeve plate (8) is realized.

* * * * *